Aug. 15, 1967 G. H. W. MEEDER 3,336,106
PROCESS FOR PRODUCING SODIUM CARBONATE FROM SODIUM
BICARBONATE OBTAINED BY THE AMMONIA-SODA PROCESS
Filed June 28, 1965
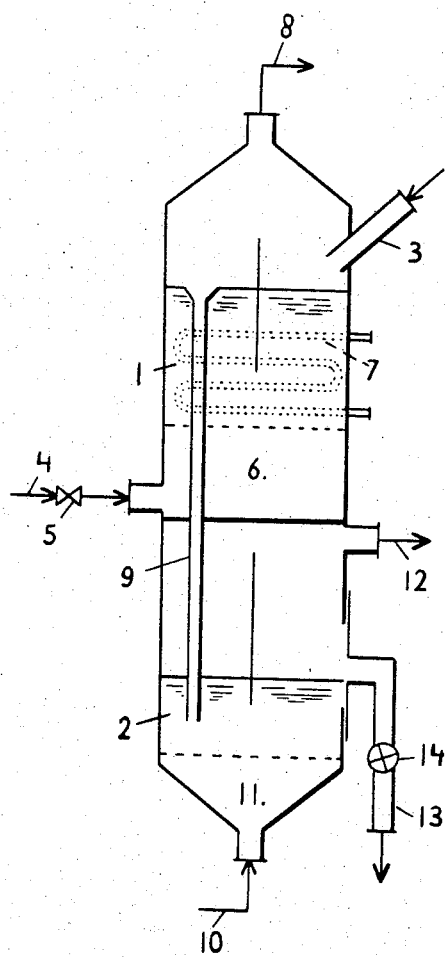
INVENTOR.
GERARDUS HENDRIK WOUTER MEEDER
BY
C T Cross 3,336,106
PROCESS FOR PRODUCING SODIUM CARBONATE FROM SODIUM BICARBONATE OBTAINED BY THE AMMONIA-SODA PROCESS
Gerardus H. W. Meeder, Delfzijl, Netherlands, assignor, by mesne assignments, to Diamond Alkali Company, Cleveland, Ohio, a corporation of Delaware
Filed June 28, 1965, Ser. No. 467,234
Claims priority, application Netherlands, July 2, 1964, 64—7,506
3 Claims. (Cl. 23—63)

ABSTRACT OF THE DISCLOSURE

Sodium carbonate is produced by heating crude sodium bicarbonate crystals in a first fluidized bed maintained at a temperature of less than 140° C. using a fluidizing gas stream which contains finely-divided water droplets, followed by calcination of the product from the first fluidized bed in at least one subsequent operation, preferably another fluidized bed, at a temperature in excess of 140° C. The soda ash obtained in this manner has a very low ammonia content.

---

This invention relates to a process for producing sodium carbonate from sodium bicarbonate obtained by the ammonia-soda process, and more particularly relates to a method for the fluidized bed treatment of sodium bicarbonate from the ammonia-soda process to remove bound ammonia and thereafter calcining the solid product to obtain sodium carbonate or soda ash.

Several proposals have been made heretofore to use the fluid bed technique for the so-called calcination of sodium bicarbonate to sodium carbonate known in the industry as soda ash. Essentially, these proposals can be distinguished from each other by the way in which the heat required for decomposing the sodium bicarbonate is supplied to the fluid bed. This may be effected by recirculating part of the sodium carbonate produced which is passed through a heater and is heated therein to a temperature higher than the desired fluidized bed temperature before being returned to the fluidized bed. According to another proposal, steam coils are arranged in the fluidized bed or, when using two or more calcining stages operated at different temperatures, such coils are arranged in each fluidized bed. Preheating a fluidizing gas stream which is then introduced at a high temperature into the fluidized bed is a further possibility for supplying the required heat to the bed.

It has been experienced that the ammonia content of the final product is inadmissibly high when sodium bicarbonate produced by the usual ammonia-soda process is calcined in a fluid bed in accordance with the methods proposed heretofore.

It may be due to this that until now these methods, the attractiveness of which is apparent, have not been reduced to practice and that there still is made use of the conventional rotating drums which, in the older embodiments, are heated externally and, in the newer embodiments, are provided with internal heating coils, through which steam is passed. It is true that the investment, operating, and maintenance costs of such calciners are rather high but they render a good product.

It is an object of this invention to produce commercial sodium carbonate, or soda ash, having a low ammonia content from sodium bicarbonate obtained by the ammonia-soda process while using an improved fluid bed calcining process.

It has been found that this object may be attained by subjecting the crude ammonia-soda process bicarbonate to be converted to sodium carbonate, to a first calcining step wherein the fluidizing medium contains water in the liquid state.

In accordance with the above, this invention provides a process for producing sodium carbonate from crude sodium bicarbonate, obtained by the ammonia-soda process, wherein the crude bicarbonate is heated in two or more steps, at least the first of which is conducted as a fluidized bed treatment, wherein the fluidizing stream coming into contact with the crude bicarbonate carries with it finely-divided water droplets so as to liberate bound ammonia which, with any carbon dioxide evolved may be recovered.

Apparently, for removing bound ammonia, which usually is supposed to be present substantially in the form of ammonium chloride, a fluidizing medium containing water in the liquid phase is required. As a matter of fact, water vapor which is formed in the decomposition of the bicarbonate and which also may be used as the fluidizing medium according to a prior proposal, is not capable of providing a final product having a low ammonia content.

Evidently, the water droplets present in the fluidizing stream have to be fine enough so as not to affect fluidization. For example, water or an aqueous liquid may be sprayed into the fluidizing stream, the impact surfaces of the spray device being arranged so as to prevent any large droplets from being carried along with the stream, if necessary. However, in a very simple and reliable embodiment the fluidizing stream is a fluid consisting at least in part of steam wherein prior to entering into the bed containing bicarbonate a "mist" has been produced by either a pressure or temperature change, or by both a temperature and pressure change to below the dew point of the water vapor in the gas.

Generally, the conditions prevailing in the first step of the process according to this invention will preferably be chosen so that decomposition of an appreciable amount of the bicarbonate is effected in this step. However, in view of the desired reduction of the ammonia content under the influence of water in the liquid state, the conditions should not be so drastic as to attain the complete conversion of all of the bicarbonate in a single step. In particular, the mean temperature prevailing in the fluidized bed in the first step must not be chosen higher than about 140° C. It may safely be assumed that at higher temperatures the period of existence of the droplets, which are evaporating under the conditions prevailing in the fluidized bed, becomes so short that the droplets no longer have a substantial effect on the ammonia removal. For completing the conversion of the bicarbonate at least one succeeding step is required, wherein the product is heated to a higher temperature than 140° C. In this further heat treatment the product from the first step is preferably also kept in a fluidized state.

This invention will be illustrated with reference to the accompanying drawing by two examples.

In order that those skilled in the art may better understand the present invention and the preferred method by which it may be practiced, the following specific examples are offered.

Example 1

To an experimental reactor of the type schematically shown in the drawing wherein two fluidized beds 1 and 2 may be maintained by separate fluidizing streams, 21 kg./hr. of a mixture comprising 3 parts by weight of soda ash and 2 parts by weight of crude sodium bicarbonate having an ammonia content of 1.6% and a moisture content of 13.6% were supplied through conduit 3.

18. m.³/hr. of wet steam at a pressure of 0.8 atmosphere were supplied through conduit 4 provided with release valve 5 to distribution chamber 6 arranged below upper bed 1. The temperature of this bed was maintained at about 110° C. by means of steam heated coil 7. The vapors and gases ($H_2O$, $Cl_2$, and $NH_3$) which passed through and were evolved in bed 1 were discharged from the upper part of the reactor through conduit 8.

The product formed in upper bed 1 and for the greater part already consisting of soda ash flows into lower bed 2 through overflow pipe 9. The lower bed was kept in a fluidized state by supplying about 20 m.³/hr. of lime-kiln gas containing 40% of $CO_2$ and having a temperature of 155° C. through conduit 10 to distribution chamber 11 arranged below bed 2. By means of a heating coil (not shown) the temperature of this bed was maintained at 210° C. The carbon dioxide-containing gas was discharged through conduit 12.

Soda ash having an ammonia content varying from 0.009 to 0.011% was discharged from bed 2 through conduit 13 provided with rotating gate valve 14.

*Example 2*

30 kg./hr. of the mixture of soda ash and bicarbonate used in Example 1 were supplied through conduit 3 to the same experimental reactor. In this case, the fluidizing stream used for the upper bed consisted of 2 parts by volume of air and 1 part by volume of wet steam, the mixture being supplied through conduit 4 in an amount of 18 m.³ per hour. The temperature of the upper bed was maintained at 115–125° C.

Air having a temperature of 120–125° C. was used as the fluidizing medium for the lower bed, and was supplied through conduit 10 in a quantity of 20 m.³ per hour. The temperature of the lower bed was 205–220° C.

The ammonia content of the soda ash produced was 0.011%.

In comparison, it may be remarked that whether or not the fluidizing media contained water as a vapor as opposed to finely divided liquid, it was not possible to produce soda ash having an ammonia content lower than 0.02–0.03.

What is claimed is:

1. A process for producing sodium carbonate from crude sodium bicarbonate obtained by the ammonia-soda process, said crude sodium bicarbonate having water and ammonium chloride associated therewith, which process includes the steps of:
    (a) heating said crude sodium bicarbonate in a fluidized bed maintained at a temperature of less than 140° C. and using a fluidizing gas stream which carries with it finely-divided water droplets, whereby bound ammonia associated with the crude sodium bicarbonate is liberated and a portion of the bicarbonate is decomopsed to water vapor, carbon dioxide and sodium carbonate and,
    (b) subsequently heating the solid product from step (a) in at least one additional step to a temperature in excess of 140° C., whereby the remaining sodium bicarbonate is converted to sodium carbonate.

2. The process of claim 1 wherein the fluidizing gas stream in step (a) consists at least partially of steam and the temperature-pressure relationship of said fluidizing gas stream is changed thereby forming finely-divided water droplets in said fluidizing gas stream.

3. The process of claim 1 wherein the subsequent heating of step (b) is conducted in at least one fluidized bed maintained at a temperature in excess of 140° C.

References Cited

FOREIGN PATENTS 723,108  2/1955  Great Britain.

OSCAR R. VERTIZ, *Primary Examiner.*

G. T. OZAKI, *Assistant Examiner.*